Nov. 30, 1965  R. J. LAGASSE  3,220,050

METHOD AND APPARATUS FOR PROCESSING SHRIMP

Filed July 2, 1963  6 Sheets-Sheet 1

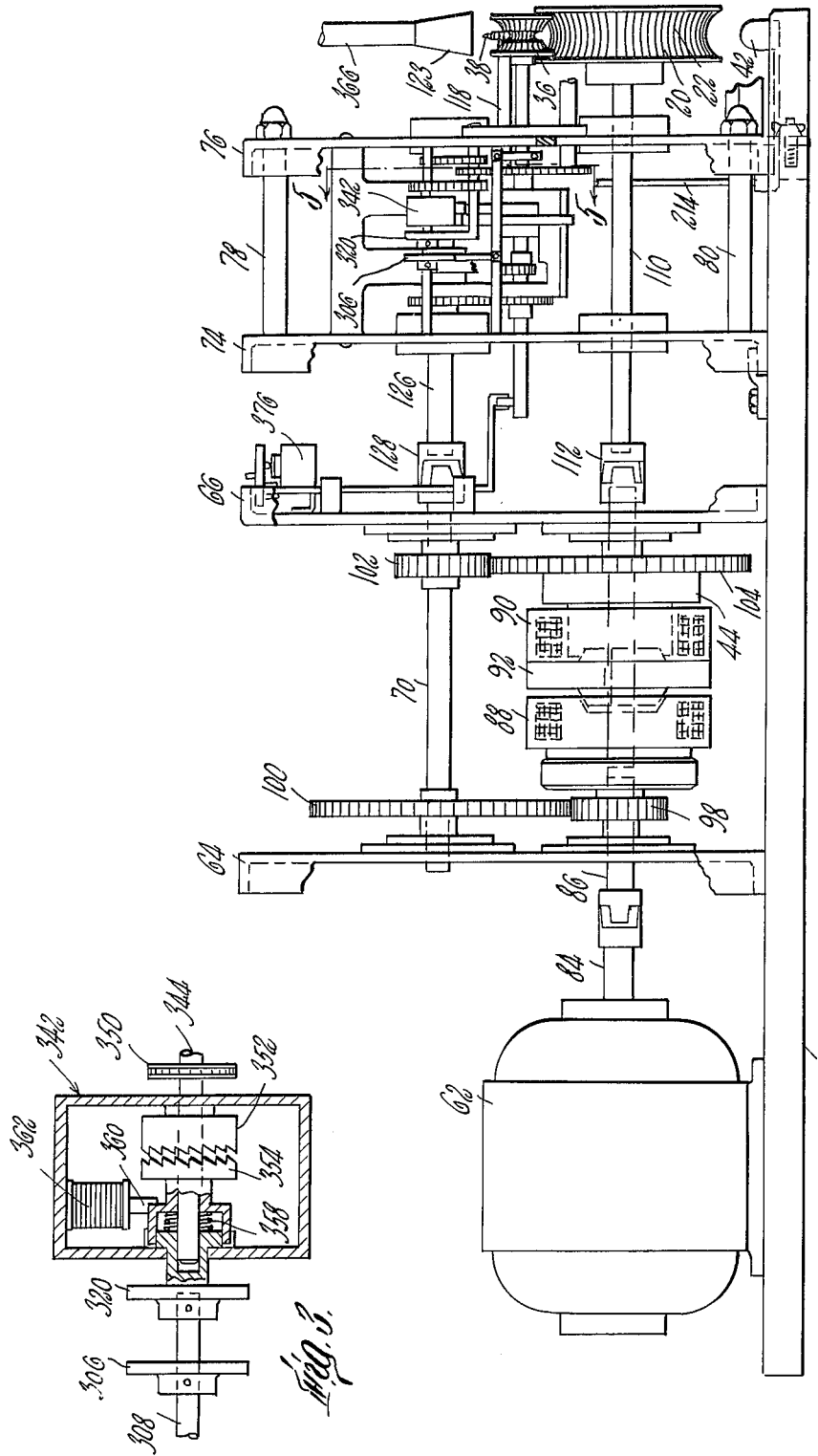

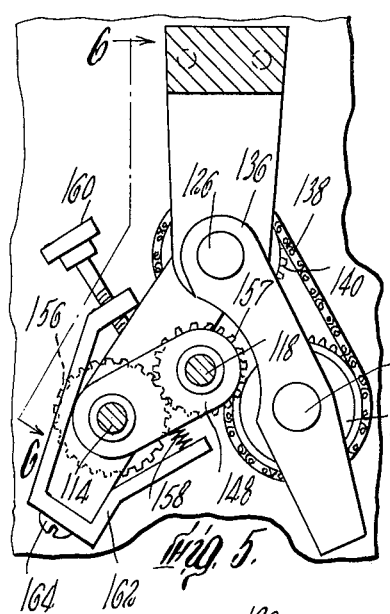
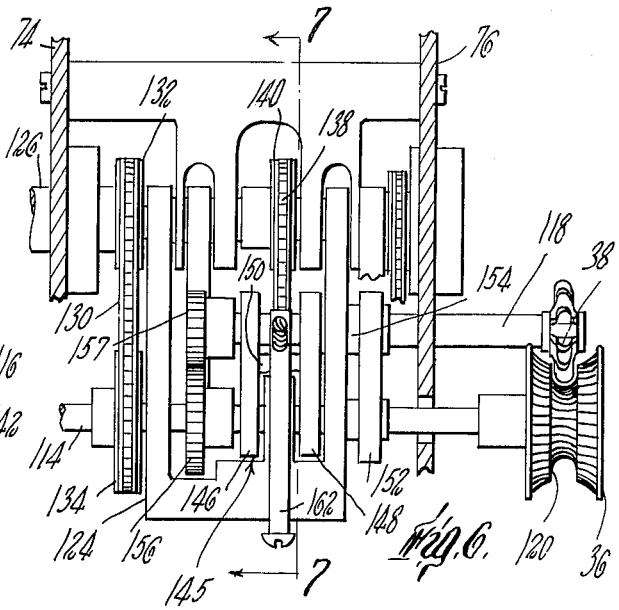
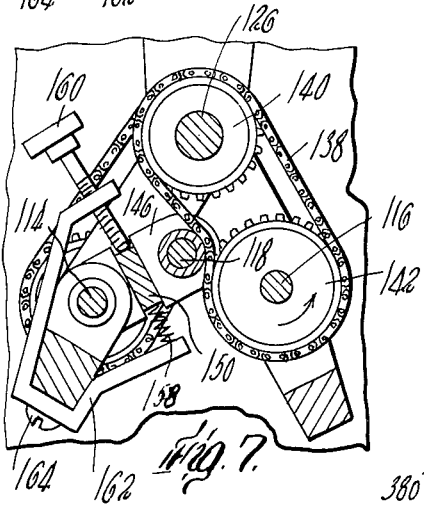
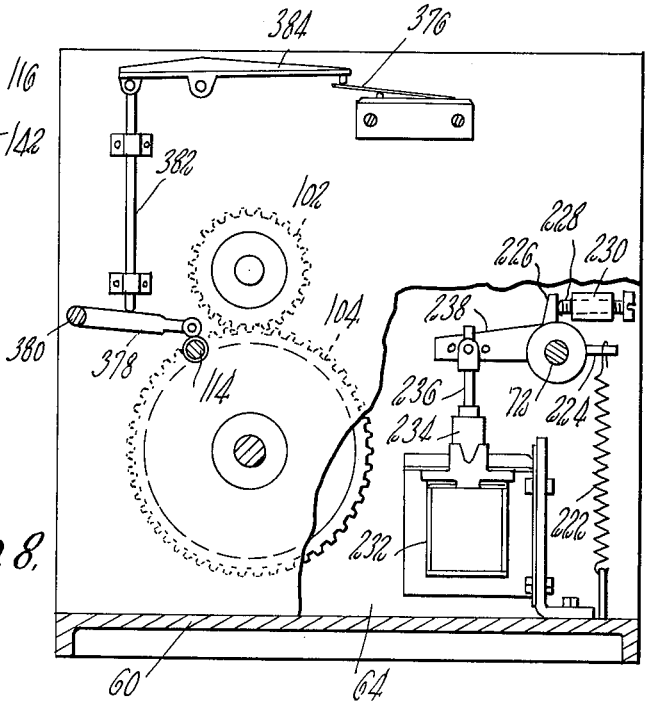

Nov. 30, 1965  R. J. LAGASSE  3,220,050
METHOD AND APPARATUS FOR PROCESSING SHRIMP
Filed July 2, 1963  6 Sheets-Sheet 5
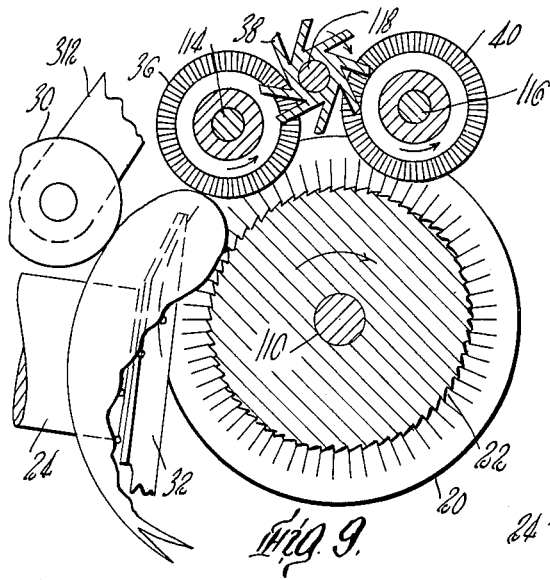
Fig. 9.
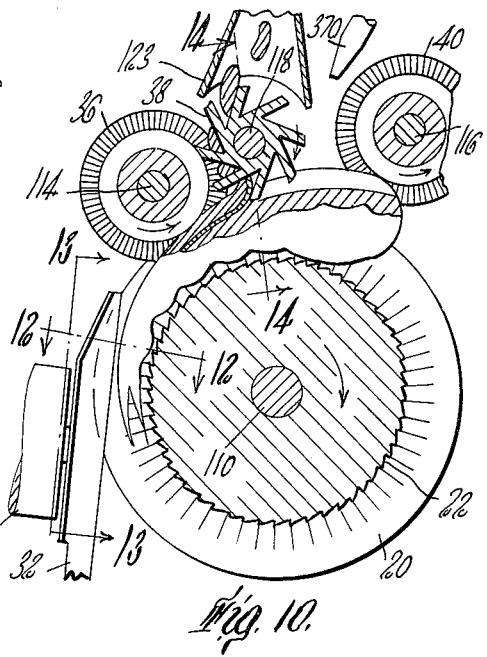
Fig. 10.
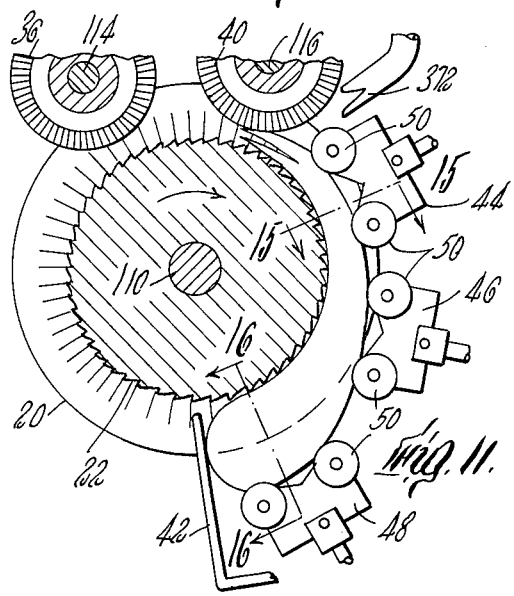
Fig. 11.
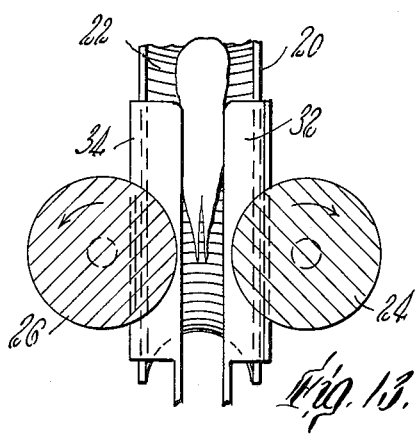
Fig. 12.
Fig. 13.
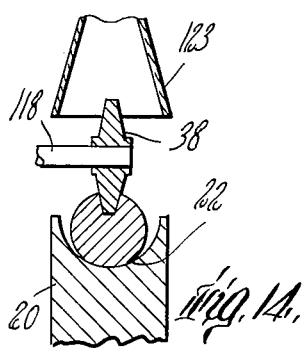
Fig. 14.
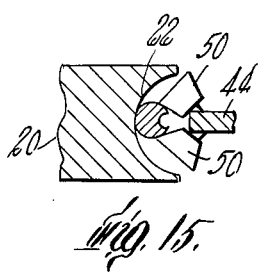
Fig. 15.
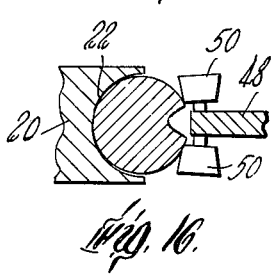
Fig. 16.

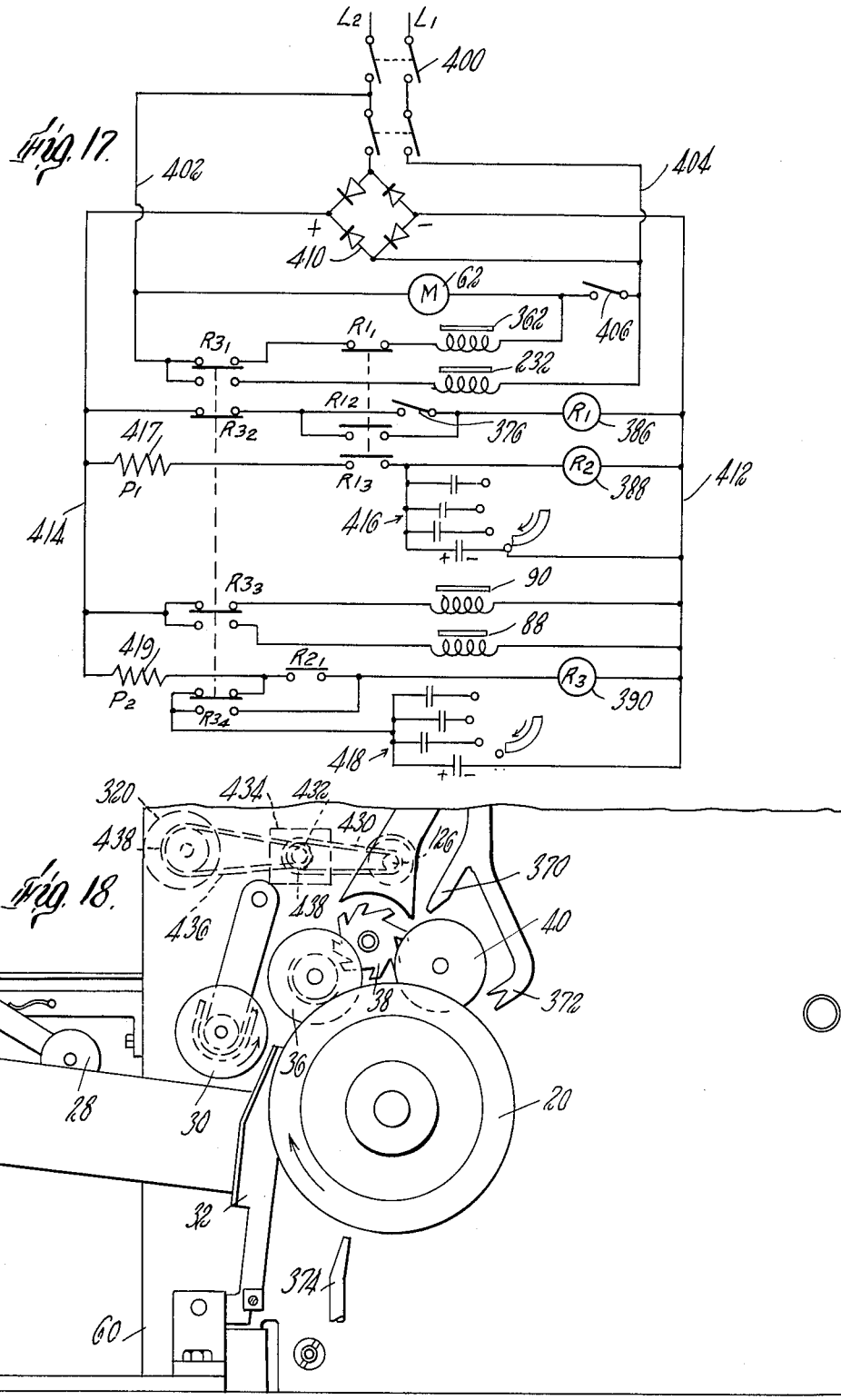

United States Patent Office 3,220,050
Patented Nov. 30, 1965

3,220,050
METHOD AND APPARATUS FOR PROCESSING SHRIMP
Rene J. Lagasse, Edinburg, Tex., assignor to United Fruit & Foods Corporation, Boston, Mass., a corporation of Delaware
Filed July 2, 1963, Ser. No. 292,218
20 Claims. (Cl. 17—2)

The present invention relates to a method and apparatus for processing shrimp.

The principal objects of the invention are to provide a novel method adapted for the processing of shrimp, and an apparatus which is particularly, but by no means exclusively, adapted for the performance of such processing upon cooked shrimp.

The present invention is particularly concerned with the development of a method and a machine which will operate in a satisfactory manner for the processing of cooked shrimp. As compared with the raw article, the cooked shrimp is an appreciably firmer, much less pliable mass, and, as a consequence of cooking, has a generally curled conformation from head to tail as a result of contraction along the ventral line during the process. The cooked shrimp tissue is readily separable into integral muscular bundles which, thanks to cooking, readily separate one from the other, the intermuscular cohesion of the raw shrimp having been destroyed.

The method and apparatus herein disclosed are constructed and arranged for the performance of the several processing operations required while the shrimp is firmly held in a vertically oriented position which will avoid excessive bending or straightening of the shrimp body which might cause one or more portions of the shrimp to be broken off. The shrimp supporting guiding and operating devices developed in accordance with the invention have been found useful for the processing also of unshelled and uncooked shrimp.

A feature of the invention consists in the support of the shrimp during the processing operations upon a rotating member or wheel which serves also as a rasp adapted for cleaning the ventral under portion of the shrimp.

In accordance with the invention shrimp are fed serially to a rotary shrimp transfer member which is formed with a shrimp receiving rasp-surfaced peripheral groove having a transverse curvature conforming substantially to the configuration of the ventral portion of the shrimp, and a peripheral curvature conforming substantially to the natural lengthwise curvature which would be assumed by the shrimp during cooking, the shrimp is externally engaged and advanced in said groove headfirst at a controlled feed rate in said groove about the axis of the rotary shrimp transfer member, and the rotary shrimp transfer member is rotated at a high rasping rate in the diection of feed so that the rasp-surfaced groove of said rasping wheel is moved from tail to head of the shrimp for rasping the ventral portion thereof. A rotating routing tool is applied to the dorsal surface of the shrimp during the advance of the shrimp about the axis of the transfer member to de-vein and to remove the associated overlying strip of muscle material.

In one embodiment of the invention the transfer member is driven at a feed rate to carry the shrimp past the location of the routing tool, the progress of the shrimp being thereafter arrested at a holding station while at the same time the rotational rate of the shrimp transfer member is substantially increased to effect the rasping of the ventral surface of the shrimp.

In an alternative embodiment of the invention, the shrimp transfer member is continuously rotated at a high rasping rate. A guide wheel driven at a relatively slower feeding rate is engaged against the dorsal surface of the shrimp to effect the advance of the shrimp about the axis of the transfer member at a controlled feed rate so that the rasping surface of the rapidly rotating transfer member is effective to rasp the ventral surface of the shrimp from tail to head while the routing tool is simultanenously engaged with the dorsal surface of the shrimp to de-vein and to remove the overlying strip of muscle material therefrom.

With the above-noted and other objects in view as may hereinafter appear, the several features of the invention will be readily understood by one skilled in the art from the following description taken in connection with the accompanying drawings, in which:

FIG. 2 is a view in left side elevation of the shrimp processing machine of FIG. 1, but with the feed mechanism omitted and with other parts broken away to show underlying parts;

FIG. 3 is an enlarged detail sectional view of the feed wheel operating mechanism as shown in FIG. 2 and more particularly as indicated by the section line 3—3 of FIG. 4;

FIG. 5 is a detail sectional view looking from the front of the machine taken on a line 5—5 of FIG. 2, but on an enlarged scale, illustrating the suspension and drive assembly for the primary and secondary guide wheels and the vein cleaning router;

FIG. 6 is a detail view partly in section taken on a line 6—6 of FIG. 5 illustrating the suspension and drive assembly of FIG. 5 looking from the left;

FIG. 7 is a detail sectional view looking from the front taken on a line 7—7 of FIG. 6;

FIG. 8 is a sectional view in front elevation taken on a line 8—8 of FIG. 1 to illustrate particularly the three principal operating shafts from which the machine drive is taken, together with the driving connections therefor;

FIG. 9 is a sectional view in front elevation taken substantially on a line 9—9 of FIG. 1, but on an enlarged scale, illustrating particularly the arrangement of the rotatable rasp, the main and auxiliary guide wheels and router, and the position of the feed rolls and feed for the transfer of a cooked shrimp from the feed rolls on to the rasp;

FIG. 10 is a view substantially similar to FIG. 9, but illustrating a further step in the operation in which the router is engaged in the dorsal muscle cover strip and vein removal operation;

FIG. 11 illustrates a still further step of the operation in which the shrimp is supported in a stationary position for the performance of the high-speed rasping operation;

FIG. 12 is a detail sectional view taken on a line 12—12 of FIG. 10 illustrating the operation of the tail stop and guides for positioning the tail portion of the shrimp against the rasp;

FIG. 13 is a detail sectional view taken on a line 13—13 of FIG. 10 illustrating the relationship of the feed rolls, tail guides and tail portion of the shrimp during the operation of positioning the shrimp against the rasp;

FIG. 14 is a detail sectional view taken on a line 14—14 of FIG. 10 illustrating particularly the operation of the router with relation to the rasp and the suction hood during the vein cleaning operation upon a shrimp;

FIG. 15 is a detail sectional view taken along the line 15—15 of FIG. 11 to illustrate the manner in which the tail portion of the shrimp is held against the rasp during the rasping operation;

FIG. 16 is a detail sectional view taken along the line 16—16 of FIG. 11 to illustrate the manner in which the head portion of the shrimp is held against the rasp during the rasping operation;

Figure 4:
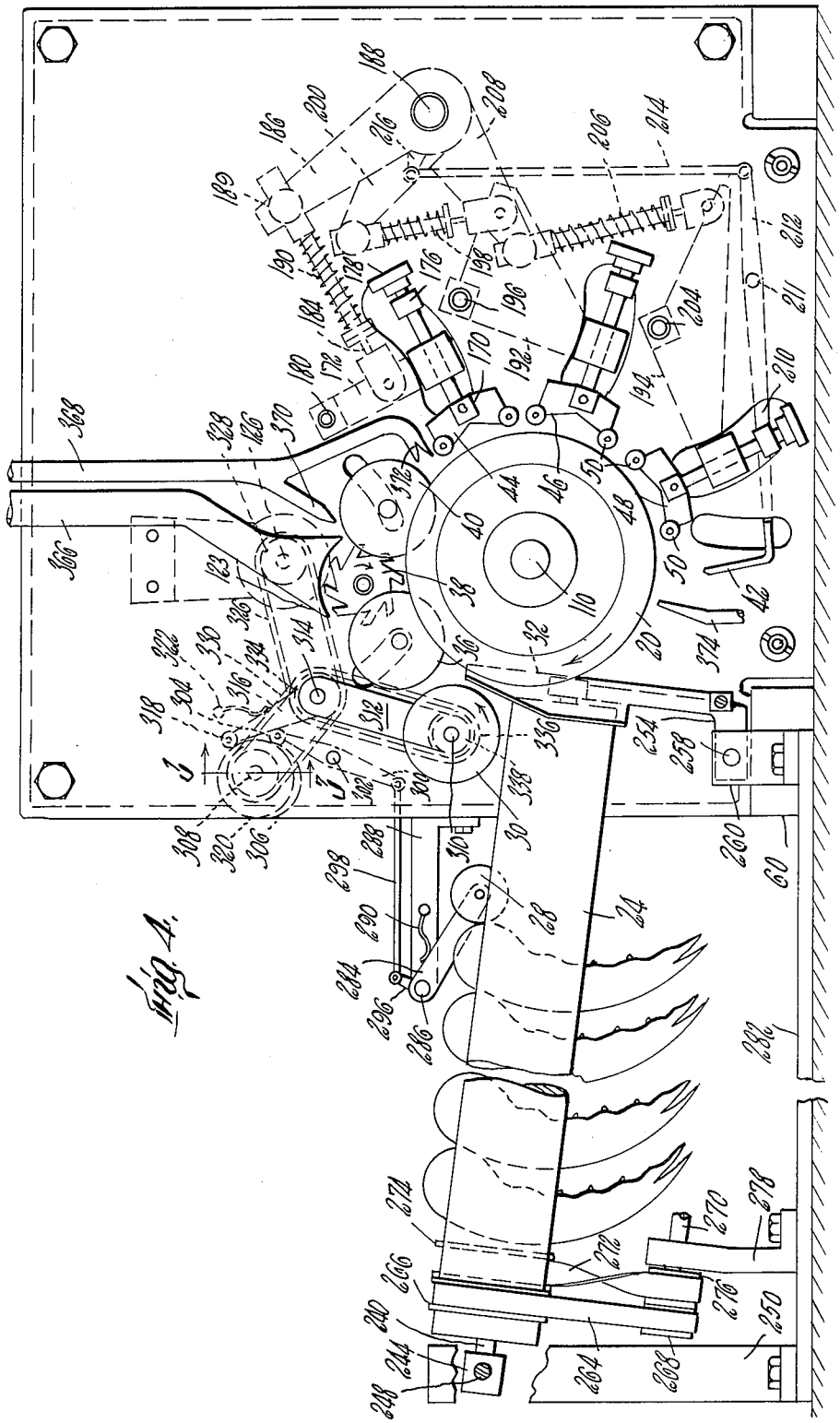
FIG. 4 is a view in front elevation of the shrimp processing machine of FIGS. 1 and 2.

FIG. 17 is a diagrammatic view of the electrical connections employed for effecting the operation of the shrimp processing machine; and FIG. 18 illustrates an alternative embodiment of the invention in a shrimp processing machine, the parts shown being substantially similar to those shown in FIG. 4, but with the shrimp holding assembly including the shrimp dorsal surface engaging trucks and head stop removed and with a continuous drive for the cam imparting a periodic oscillation to the feed roll and auxiliary feed roll of the machine in place of the intermittent one-revolution cam drive of FIG. 4.

Referring to the drawings, the principal components of the apparatus employed for feeding, supporting and for operation upon a cooked shrimp in accordance with the invention as best shown in FIG. 4 comprises a rotary shrimp transfer member or rasp 20 in the form of a wheel having a serrated annular shrimp receiving groove 22 which engages the shrimp ventral portion engaging surface. The rotary rasp 20 is of a diameter proportioned to the size and contour of the shrimp to cause the shrimp in its normally curled position after cooking to conform as closely as possible to the contour of the rasp. The dimensions of the shrimp receiving groove 22 of the rasp have been found to be critical especially as regards the cross-sectional diameter. In order that the shrimp may be held by the rotary member 20 firmly and at the same time without any tendency to stick, a groove is employed which is nearly semi-circular in depth, and is of a diameter corresponding to the size of shrimp being operated upon. It has been found that for the largest sizes grades of 14 to 17 shrimp or less per pound the groove 22 for best results should have a diameter of ⅞". For shrimp running from 14–17 to 26–29 per pound the groove should have a diameter of ¾". For shrimp running from 26–29 per pound to 32–40 per pound the groove should have a diameter of ⅝". For shrimp running from 32–40 per pound to over 50 per pound the groove should have a diameter of ½". The diameter of the rotary shrimp transfer member or rasp 20 should in general approximate 2" inside diameter and 3" outer diameter for the larger sizes, and 1⅞" inside diameter with 3" outer diameter for the smaler sizes. A transfer wheel having a wheel diameter of 1¾" inside diameter may be added for processing the smallest sizes of cooked shrimp, although shrimp of all sizes have been successfully processed on a wheel or rasp 20 having an inner diameter of 1⅞" and an outside diameter of approximately 3". In general, experimentation has shown that some variation is possible in the inside diameter of the shrimp transfer member without harm to the shrimp, but that the transverse or cross-sectional diameter of the groove must conform within relatively close limits to the size of shrimp being processed.

The rotary rasp 20 may be regarded as the heart of the machine about which are grouped a plurality of feed-in, operating and discharge stations. The feed mechanism is operative at the feed station to feed in and to position the cooked shrimp, one at a time, against the continuously rotating rasp. Next in the direction of rotation of the rasp there is provided a dorsal cover muscle strip and vein removing station, this station comprising an assembly of two guide wheels and an intervening router which is continuously driven in a direction which in the preferred embodiment shown is counter to the direction of feed to effect the removal of the central cover strip of superficial dorsal abdominal muscles and the underlying intestinal material in the vein. It will be understood, however, that if so desired, a router properly designed for the purpose may be driven in the opposite or feed direction for the removal of said unwanted material.

In accordance with the illustration of FIGS. 1 to 17 inclusive as hereinafter more fully set forth, there is provided at a further point around the axis of the shrimp transfer member, a shrimp arresting and holding station at which are provided shrimp holding devices and a head stop by means of which the shrimp is held while the transfer member or rasp 20 has imparted thereto a high-speed longitudinal movement in the feed direction to rasp out the ventral portion of the shrimp, said rasping operation taking place in a tail-to-head direction which has been found most effective for the cleaning of unwanted material from the ventral side of the shrimp. The subsequent withdrawal of the holding and head stop devices causes the processed shrimp to be ejected from the machine.

The feed mechanism refered to comprises two shrimp carrier rollers 24, 26 supported in a downwardly inclined parallel relation and driven in opposite directions to support the head portion of the shrimp therebetween. Shrimp supported between said rollers are admitted one at a time past a feed indexing wheel 28 and then past a feed wheel 30 which is continuously driven to engage with and feed the shrimp against the rotating rasp 20. The shrimp supported with its head above the rollers and the tail portion suspended therebetween is moved against the annular grooved rasping surface of the rasp by the feed roller 30, the lower tail portion of the rasp being guided between two converging tail guides 32, 34.

The muscle cover strip and vein removing assembly with which the shrimp is now engaged comprises a driven guide wheel 36, a router 38 positively driven in a reverse direction immediately adjacent thereto and a second driven guide wheel 40. The guide wheels and router referred to are constructed and supported as hereinafter more fully set forth to continue the advance of the shrimp through the station and at the same time to effect the removal of the muscle cover strip and underlying intestinal material to the desired depth as hereinafter more fully set forth.

The shrimp holding and head stop assembly provided at the shrimp arresting and holding station to which the shrimp is now moved by the continued rotation of the rasp comprises three shrimp holding trucks designated at 44, 46, 48, each having two pairs of converging support rollers 50, and a head stop 42 shiftable to an operative position in which the advancing movement of the shrimp is arrested by engagement with the head stop 42, and in which the shrimp is firmly engaged and held along its length against the rasp by the truck supported rollers 50. While the shrimp is so held, the rate of rotation of the rasp 20 is substantially increased thus producing a rasping action which removes the ventral lipid material and various other unwanted substances which may be present as above set forth.

The machine on which the several shrimp operating components are mounted comprises a base plate 60 on which is mounted a permanent drive assembly including a motor 62 and a frame comprised of two vertically disposed plates 64, 66 separated from one another and providing support for three horizontally disposed operating shafts 68, 70, 72, each of which is projected through the forward plate 66 and is provided at its forward end with a coupling through which power is transmitted to operate the several operating components of the shrimp processing apparatus. As hereinafter more fully to be described the several operating components of the shrimp processing apparatus together with their supporting and moving parts are mounted on a separate cage-like frame having two vertical plates 74, 76 spaced from one another in parallel relation and bolted together by spacers 78, 80 so that said frame together with all of said components with the exception of the shrimp carrier rollers and tail guides 32, 34 which are separately mounted may be conveniently removed as a unit for cleaning and sterilizing at suitable intervals. The frame for the shrimp processing head assembly of the machine comprising the plates 74, 76 is secured to the base plate 60 by means of lugs 81 which engage the flanged lower edge of plate 74 (see FIG. 1) and by two readily removable clamping screws which extend through bores in the plate 76 and are screw threaded into lugs on the base 60.

Figure 1:
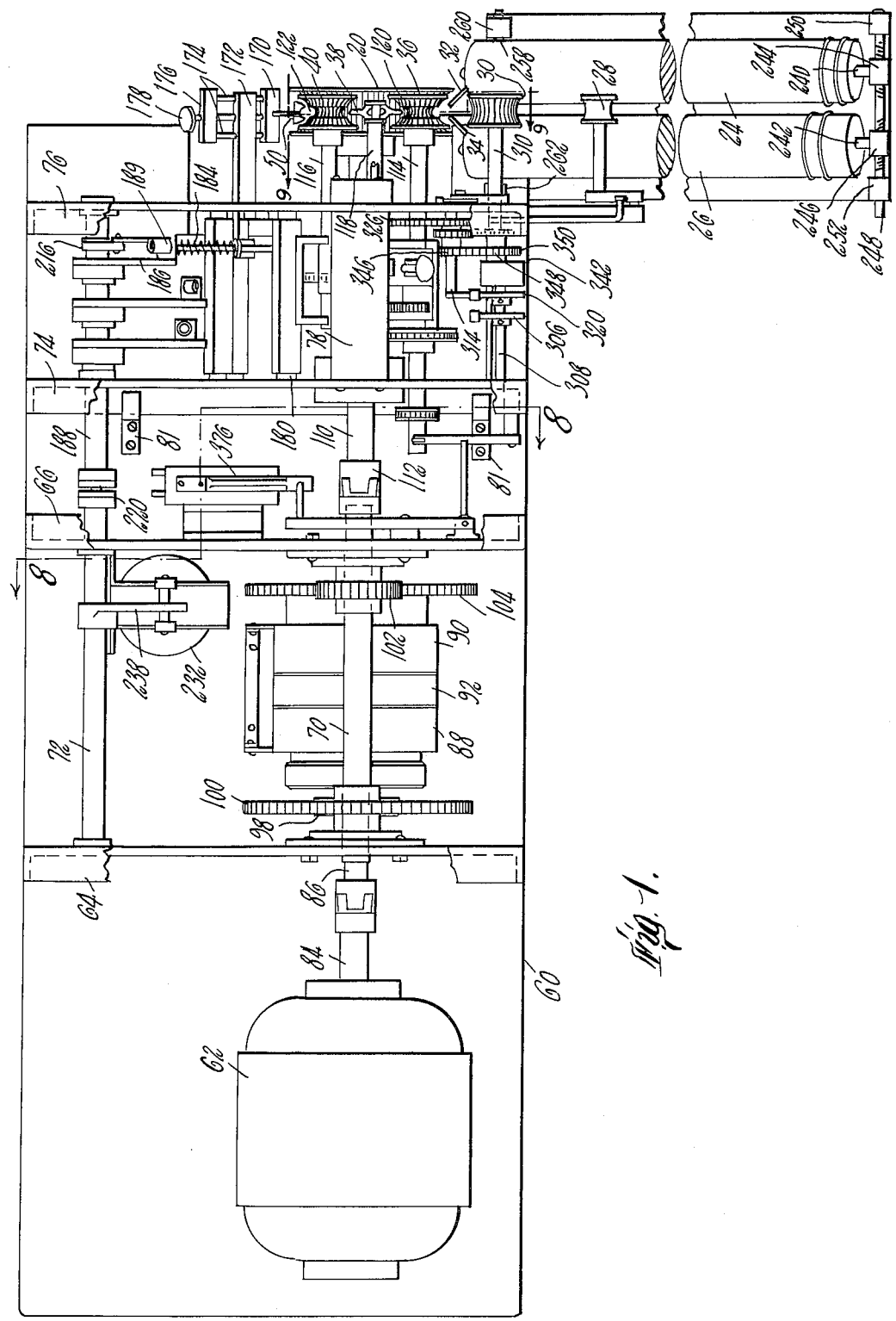
FIG. 1 is a plan view of a machine adapted for the processing of cooked shrimp embodying in the preferred form the several features of the invention, portions of the machine having been broken away to show underlying parts.

The operating shaft 68 forming part of the permanent drive assembly is supported in line with the armature shaft 84 of the drive motor 62 and is connected to be driven therefrom through a two-speed clutching device at either a low or high speed rate. As shown in FIGS. 1 and 2, the armature shaft 84 is connected by means of a coupling with a short shaft 86 supported in a bearing in the plate 64. The clutching device referred to comprises a high-speed clutching element 88 which is secured to the end of drive shaft 86 and is sleeved to turn freely on the shaft 68, a slow-speed clutching element 90 loosely sleeved on the shaft 68 and an intermediate driven clutch element 92 which is keyed to turn with and is axially slidable on shaft 68. The slow-speed driven element 90 is driven from the shaft 86 through connections which include a gear 98 mounted on the shaft 86, a meshing gear 100 secured to the operating shaft 70, a second gear 102 on the shaft 70 which meshes with a large gear 104 secured to the slow-speed driven clutch element 90. The clutch is of the electromagnetic type in which each of the high-speed clutch element 88 and low-speed clutch element 90 has mounted thereon a ring magnet which acts when energized to attract a ring armature element formed on the interposed shiftable driven clutch element 92.

The third operating shaft 72 supported between the plates 64, 66 takes the form of a rock shaft which, as hereinafter more fully set forth is rocked between alternative inoperative and advanced positions by means of a solenoid in the one direction and by means of a return spring. The operating shafts 68, 70, 72 are arranged to project through the forward plate 66 and are fitted at their forward ends with couplings by means of which they are connected respectively to driven elements in the detachable shrimp processing unit of the machine about to be described. It will be noted that the drive shaft 68 with its coupling provides a high-speed, low-speed outlet, the shaft 70 together with its coupling provides an intermediate speed drive in one direction, and the shaft 72 together with its coupling provides an outlet capable of producing rocking movement.

The rasp 20 on which the cooked shrimp is supported during each of the successive processing operations comprises a cylindrical wheel preferably of a hard non-corrosive material mounted on the forward end of a drive shaft 110 (see FIGS. 2, 4 and 9–11) which is carried in bearings formed in the two plates 74, 76 and at its rear end is provided with a coupling member 112 which engages the coupling member of the mating end of the drive shaft 68 of the drive unit.

The primary and secondary guide wheels 36, 40, which together with the router 38 form the muscle cover strip and veing cleaning assembly of the machine, are mounted respectively on forwardly projecting shafts 114, 116 (see FIGS. 5–7) each of which forms a part of a separate suspension unit on which the associated guide wheel is movable toward and away from the rasp 20. The routing tool 38 is carried on a forwardly projecting drive shaft 118, and, as hereinafter set forth, is supported with relation to the primary guide wheel 36 for adjustment in a generally up and down direction in order to determine the depth of the cut taken by the router. As hereinafter more fully set forth, the guide wheels 36, 40 are both operated in a counterclockwise direction as shown, for example, in FIG. 9 so that the shrimp engaging surface will travel in the same feed direction with that of the rasp. The routing tool 38 is driven in a reverse or clockwise direction which is reverse to the direction of feed of the shrimp imposed by the feeding movement of the rasp and guide wheels.

The peripheries of the guide wheels 36, 40 are formed with peripheral grooves contoured for engagement with the dorsal surface of the shrimp. The total width of each guide wheel is slightly less than that of the rasp 20 permitting the guide wheels to move a subtantial distance into the groove portion 22 of the rasp. The guidewheels are preferably constructed of a relatively hard non-corrosive material which may be pressed rubber. The surface of the peripheral groove of each guide wheel is serrated to intensify the frictional contact of the guide wheel with the shrimp engaged thereby.

The guide wheels 36 and 40 and the router 38 are constructed and arranged to permit the guide wheels to be placed in close proximity to one another, the interposed router being deeply embedded between them. A narrow annular slot 120 is formed in the bottom of the peripheral groove of the primary guide wheel 36 as specifically shown in FIG. 6 and a similar slot 122 is formed in the base of the peripheral groove of the secondary guide wheel 40 to receive the cutting teeth of the router 38. The sides of these slots are contoured to fit closely to the sides of the router cutting teeth, and the depth of each said slot is gauged to provide a sufficient space for the removal of material picked up by the cutting teeth. The arrangement provides for a maximum traction on and control of the shrimp being de-veined while limiting the impedance resulting from the action of the counter-rotary router.

The dorsal cover muscle strip and vein cleaning router 38, as best shown in FIGS. 6, 9, 10 and 14, comprises a sleeve hub secured to the shaft 118 and a series of undercut teeth which are generally tapered widthwise to conform as closely as possible to the general shape of the dorsal groove which is formed by the removal of the muscle cover strip and vein from the shrimp. The outside diameter of the router is somewhat less than that of the guide wheels 36, 40 to effect the desired compact arrangement of the guide wheel and router assembly and also to produce a maximum lifting action on the part of the teeth while in operation. The router may be made of a pliant or a rigid material which is non-corrosive. It will be noted that the close fit maintained between the edges of each router tooth and the sides of the peripheral slots 120, 122 formed in the respective guide wheels 36, 40 causes the material lifted from the back vein of the shrimp to be held firmly on the tooth until it has been removed a substantial distance from the shrimp and is thrown upwardly into an exhaust hood 123. The close fitting, dovetailing arrangement of the cutter teeth with relation to the slotted supporting surfaces of the guide wheels causes the guide wheels to provide a maximum of support to the surface of the shrimp immediately adjacent the zone of operation of the router. This assures a minimum amount of tearing of those surfaces of the shrimp immediately adjacent the cutters, and a minimum impedance in the linear travel of the shrimp while at the same time taking maximal advantage of an effective shrimp supporting and gripping device represented by the closely positioned holding wheels.

The primary guide wheel 36 and its supporting shaft 114 as best shown in FIGS. 5–7 are mounted in a U-shaped hanging frame 124 suspended from a jack shaft 126 which is suported in bearings formed respectively in the front and rear plates 76, 74 of the removable shrimp processing unit. The shaft 126 is connected at its rear end by means of a coupling 128 with the drive shaft 70 and is continuously driven therefrom at an intermediate speed. The shaft 114 and primary guide wheel 36 are continuously driven from jack shaft 126 by means of a chain 130 passing over sprockets 132, 134 mounted respectively on the jack shaft 126 and on the driven shaft 114. The secondary wheel 40 and its supporting shaft 116 are similarly supported on a hanging U-shaped frame 136 pivotally mounted on the jack shaft 126 and are continuously driven therefrom by means of a chain 138 passing over sprockets 140, 142 mounted respectively on the jack shaft 126 and on the supporting shaft 116 for the secondary guide wheel 40.

The supporting shaft 118 for the router 38 is carried in a frame 145 pivotally supported on the primary roller support shaft 114. Said frame comprises two arms 146, 148 connected by a crosspiece 150 and a third arm 152 connected to the arm 148 by a sleeve 154 which forms one of the bearings for the router shaft 118. The shaft 118 and router 38 are continuously driven in a clockwise direction, which is counter to the direction of drive of the rollers 36, 40 by means of meshing gears 156, 157 mounted respectively on the shafts 114, 118. The frame 145 with the shaft 118 and router 38 are normally held yieldably in a relatively fixed raised position with relation to the guide roll supporting shaft 114 as shown in FIG. 7 by means of a compression spring 158 which tends to force the frame 145 upwardly against a stop screw 160. The spring 158 and stop screw 160 are supported respectively by the two arms of a U-shaped bracket 162 secured by a bolt 164 to the hanging frame 124.

The movement of the router 38 on its support toward and away from the rasp 20 with the primary guide wheel 36 has the effect of controlling the depth of cut of the router with respect to the shrimp being operated upon. As the shrimp makes contact with the primary guide wheel 36 the guide wheel is pivoted away from the rasp carrying with it the router. Thus as the shrimp head, which is relatively larger than the remainder of the shrimp body, enters under the primary guide wheel, the latter is pivoted away from the rasp a maximal distance. The depth of cut of the router is also maximally deep at this point because of the manner in which it is attached to the arm of the primary guide wheel and the manner in which it has pivoted away from the rasp from a pivotal point common with the primary guide wheel.

As the essentially fuselage shape of the shrimp body passes under the primary guide wheel, the degree to which the primary guide wheel and the accompanying router are pivoted away from the rasp decreases in proportion to the thickness of the shrimp body. Likewise, the total working thickness of the edge of the router presented to the shrimp is also proportionately reduced. Thus the router is made to cut deeply into the head of the shrimp in process, and thus the depth of cut is gradually reduced until such time as the last tail segment is reached. At this point the depth of the cut is so fine that the dorsal cover muscle strip snaps off at the anterior edge of this last tail segment which is covered dorsally by a rather tough integument. Thus the dorsal cover muscle strip has been removed and the vein cleaned out along the entire first five abdominal segments of the shrimp but excluding the final tail segment. It will be understood that in the processing of ready-to-serve cocktail shrimp, nothing should be done to disturb the sixth segment other than to remove the shell therefrom and to break through the enveloping integument thereof which is accomplished by the ventral rasping operation herein described in order to facilitate freeze-dehydration.

The head stop 42 and the three holding elements comprising the trucks 44, 46, 48 with their converging support rollers 50 of the shrimp holding assembly are individually mounted on the removable shrimp processing head for simultaneous movement to and from their operative shrimp engaging position. Referring more specifically to FIGS. 1, 4, 11 and 15, the truck 44 consists of a flat plate set on edge to project within the peripheral groove 22 of the rasp 20. The truck 44 is provided with bearing supports adjacent each end for two pairs of rollers 50 and is pivotally mounted intermediate its length on a cross block 170 which is supported for adjustment radially of the rasp 20 on the forwardly offset end of a truck carrying lever 172. The cross block 170 is secured to the lower ends of two parallel pins 174 slidably supported in bores extending through the end of the lever 172 and secured at their outer ends to a second cross block 176. An adjusting screw 178 rotatably mounted in the upper block 176 between the two pins 174 is threaded to a screw threaded bore in the lever 172 for effecting the desired adjustment of the truck 44 toward and away from the rasp 20. As best shown in FIG. 1, the truck carrying lever 172 comprises a square elongated hub supported on a pivot shaft 180 between the two vertical plates 74, 76 of the shrimp processing head, and an arm having the outer end thereof offset in a forward direction so that it extends through an arcuate hole in the front plate 76 of the removable processing unit and provides support as above described for the truck 44. The truck supporting lever 172 is connected by means of a yieldable connection 184 with an arm 186 carried on an actuating rock shaft 188 for the shrimp holding unit. The yieldable rod connection 184 is pivotally connected to the lever 172 and is slidable in a bore formed in a block 189 pivoted to the arm 186. A compression spring 190 coiled about the rod 184 between a washer on the link and the block 189 acts to maintain the arm 186 and lever 172 in a normally separated position.

The trucks 46, 48 of the shrimp holding mechanism are identical in form with the truck 44 and are similarly supported on truck supporting levers 192, 194, respectively, and are similarly connected by yieldable rod connections with lever arms secured to the actuating rock shaft 188. Referring again to FIGS. 1 and 4, the truck 46 is adjustably secured to a truck supporting lever 192 having an elongated square hub which is sleeved on a pivot shaft 196 between the spaced plates 74 and 76, and a triangular-shaped lever arm having one extremity thereof formed with a forwardly projecting truck supporting offset portion, and the other arm being connected through a yieldable rod connection 198 with a lever arm 200 on the rock shaft 188. The truck 48 is similarly adjustably mounted on the forwardly offset end of the truck supporting lever 194 which is sleeved to turn on a pivot shaft 204 extending between the plates 74, 76 of the shrimp processing head and the extremity of which is connected through a yieldable rod connection 206 with a lever arm 208 on the actuating rock shaft 188.

The head stop 42 in the preferred construction shown consists of a plate which is disposed transversely of and fits radially into the annular shrimp receiving groove 22 of the rasp to form a positive stop to engage with and block advancing movement of the shrimp around the rasp axis. The head stop 42 forms the outer end of a lever arm 210 which is formed with an offset portion projecting inwardly through an aperture in the front plate 76 and with a shank portion which is pivoted on a pivot shaft 211 within the unit. A rearward extension 212 of the head stop lever is connected by an adjustable link 214 with a short lever arm 216 on the actuating rock shaft 188. The head stop 42 and lever arm 210 are shown in FIG. 4 in the normally retracted inoperative position. With the arrangement shown it will be appreciated that a rocking movement of the shaft 188 in a counterclockwise direction from the position shown will move the three shrimp holding trucks 44, 46, 48 and the head stop 42 simultaneously inwardly in engagement with an advancing shrimp to arrest and support the shrimp firmly in a stationary position against the surface of the rasp. The yieldable rod connections provided for advancing each of the trucks 44, 46, 48 causes the shrimp to be firmly held under a uniform pressure which is exerted along the entire length of the shrimp during the rasping portion of the cleaning cycle. Further, to insure the exertion of a uniform pressure on the shrimp held against the rasp as well as to maintain an accurate alignment of the shrimp being rasped, the surfaces of the holding wheels 50 are fashioned so that a decreasing included angle of contact between the contacting surfaces of each pair of rollers is presented to the shrimp going from head to tail. At the head this angle of contact may be as great as 150° as shown in FIG. 16, whereas at the tail, as specifically illustrated in FIG. 15, it may be reduced to as little as 45°. The holding assembly is well adapted during the feeding movement of the shrimp to the holding position, to engage and hold the shrimp generally in its proper position without impeding in any manner the advance of the shrimp with the rotating rasp into its holding position in which the head is brought into engagement with the head stop 42.

The actuating rock shaft 188, as best shown in FIG. 1, is connected through a coupling 220 with the forward end of the operating rock shaft 72 forming part of the drive assembly of the machine. As illustrated in FIGS. 1 and 8, the operating shaft 72 and shaft 188 connected thereto are rocked clockwise to the inoperative position of FIGS. 4 and 8 by means of a tension spring 222 connected at its upper end to a pin 224 on the rock shaft 72 and at its lower end to the base 60. Rotational movement of the shaft to the inoperative position is limited by engagement of a vertical pin 226 on the shaft with an adjustable stop screw 228 on an abutment 230 on the rear plate 64. The rock shaft 72 and connected operating shaft 188 are rocked counterclockwise from the position shown in FIG. 8 against the pressure of spring 222 in order to move the elements of the shrimp holding assembly to an operative position by means of a solenoid 232 mounted on the base 60 having armature 234 connected by a link 236 with a transversely extending arm 238 secured to the rock shaft 72.

It will be noted from the foregoing description that the operating elements of the shrimp cleaning assembly including the shrimp transfer member or rasp 20, the dorsal cover muscle strip and vein cleaning assembly and the shrimp head stop and holding assembly are mounted on shafts which extend through the front plate 76 of the head assembly supporting frame. Between the plates 76 and 74 are enclosed the suspension and drive sub-assemblies together with the drive linkages of the several working components of the machine referred to which come in contact with the shrimp. These parts are in turn drive or actuated from the three output shafts 68, 70, 72 and the associated couplings 112, 128, 220. The entire head assembly is constructed of non-corrosive high temperature resistant material, for example, stainless steel and with stainless steel ball of Teflon bearing and bushing surfaces. For cleaning, the head may be removed from the chassis, soaked in soapy water, steam cleaned, wrapped in a suitable covering and autoclaved. The arrangement shown has the advantage that it is possible to begin each processing run with a shrimp processing head assembly that is absolutely sterile.

The two shrimp carrier rollers 24, 26 associated with the mechanism for feeding shrimp successively to the machine, as best shown in FIGS. 1 and 4, are provided at their rear ends with reduced shaft extensions 240, 242 which are journaled respectively in bearing blocks 244, 246 carried on a cross shaft 248 which is rotatably adjustable in bearing support brackets 250, 252. It will be noted that the bearing blocks 244, 246 are reversely threaded to the shaft 248, so that the rear ends of the rolls 24, 26 will be simultaneously moved toward and away from a central position depending upon the direction of rotational adjustment of shaft 248. The rollers 24, 26 are provided at their forward ends with reduced shaft extensions journaled in blocks which are similarly reversely threaded to a cross shaft 258 supported at its two ends on bearing brackets 260, 262. The arrangement shown is such that the adjacent ends of the rollers 24, 26 at each end of the feed assembly in turn will be simultaneously adjusted toward and away from the central position which is at all times directly in line with the center of the shrimp receiving groove 22 of the rasp 20 to facilitate the feeding of the shrimp onto the rasp.

The shrimp carrier rollers 24, 26 are simultaneously driven in opposite directions so that the adjacent surfaces are moving upwardly to support the shrimp in a generally vertical position between the rollers. The driving mechanism, as shown in FIG. 4, may conveniently consist of a belt 264 which passes over a pulley 266 formed on the shrimp carrier roller 24 and around a pulley 268 on an idler shaft 270. The shrimp carrier roller is similarly driven by a crossed belt 272 which passes over a pulley 274 on the roller 26 and around a pulley 276 on the idler shaft 270. The shaft 270 is shown as supported on a bracket 278, and may be driven from any convenient source of power, not shown. With the present construction it will be understood that the carrier rollers 24, 26 are of smaller diameter than those normally employed, for example, in sorting shrimp, and are placed closer together, so that the head of each successive shrimp will be carried at a relatively high level between the two rollers. An important reason for this arrangement is to facilitate the operation of engaging the more upwardly placed head portion of the shrimp between the feed roller 30 and the rotating rasp 20 as hereinafter more fully set forth.

The shrimp carrier roller assembly above described is supported to permit ready removal of said assembly from the machine for cleaning and sterilizing. To this end the supporting brackets 250, 252 at the rear ends of the rollers, the brackets 260, 262 at the leading ends of the rollers, and the bracket 278 for the carrier roller drive shaft are mounted on a plate 282 on a suitable base which may for stability be secured to the machine frame. These parts mounted on the plate 282 thus form a single readily removable unit. In the embodiment shown, the tail guides 32, 34 also are mounted on the supporting brackets 260, 262 for the forward ends of the respective carrier rollers.

The auxiliary feed roller 28 cooperating with the shrimp carrier rollers 24, 26 is supported on a relatively long pivot pin which is secured to the free end of a lever 284 rotatable on a pivot 286 supported on the bracket 288 on the front plate 76 and thus forms a part of the movable shrimp processing head of the machine. The lever 284 carrying the auxiliary feed roller 28 is biased downwardly by a light torsion spring 290 secured to the bracket 288 for engagement against the upper side of the lever arm 284. An upward extension 296 of the lever 284 is connected by a link 298 with one end of a lever 300 supported to turn intermediate its length about a fixed axis 302 and at its upper end provided with a follower roller 304 which engages a cam 306 secured to a clutch driven shaft 308 forming part of a one-revolution clutch driven assembly supported between the front and rear plates 74, 76 of the removable shrimp processing unit.

The feed roller 30 is secured to a forwardly extending pivot shaft 310 rotatably supported adjacent its rear end on a lever arm 312 which is secured to the forward end of a rock shaft 314 journaled in a bearing formed in the front plate 76 of the removable shrimp processing unit. An upwardly extending cam follower arm 316 secured to the rear end of the rock shaft 314 is provided with a cam follower roller 318 which engages against a cam 320 on the clutch driven shaft 308. A torsion spring 322 acting against the cam follower arm 316 acts to move the follower 318 against the cam and at the same time to move the feed roller 30 inwardly against the rasp 20. As best shown in FIGS. 1 and 4, the feed roller 30 is continuously driven at a peripheral feed rate which may be but is not necessarily the same and in the same direction with the guide rollers 36, 40 by means of connections from the drive shaft 126 which include a sprocket chain 326 which rides around a sprocket 328 on the drive shaft 126 and around a sprocket 330 loosely sleeved on shaft 314. A second sprocket 334 integral with the sprocket 330 on shaft 314 is connected by a sprocket chain 336 with a sprocket 338 on the support shaft for the feed roller 310.

During operation of the machine in accordance with a repetitive automatic cycle, following completion of the several operations in which a shrimp is processed, the idler feed roller 28 is moved briefly to a retracted position to permit the movement of a shrimp beneath the roller, and is then allowed to fall downwardly under the influence of its spring 290 to prevent the advance of more than one shrimp. At the same time the feed roller 30 is moved to the left and upwardly to permit the passage of the newly moved shrimp therebeneath, and is then moved at a more leisurely rate downwardly and forwardly behind the shrimp to engage the shrimp firmly against the rotating rasp, and to start the feed of the new shrimp about the rasp 20. To effect this cycle of operations of the auxiliary feed roller 28 and main feed roller 30, a solenoid operated one-revolution clutch mechanism, generally designated at 342, is provided which is actuated by the electrical control mechanism of the machine to rotate the shaft 308 and cams 306 and 320 through one revolution and then to stop. Power is supplied by a continuously driven input shaft 344 which is supported in a suitable bearing in the front plate 76 of the shrimp processing unit, and in alignment with the cam supporting shaft 308. The input shaft 344 is continuously driven from the main shaft 126 through connections which include the chain 326, and sprocket 330 sleeved on the rock shaft 314, a sprocket 346 which is mounted integrally with the sleeve supported sprocket 330, and a chain 348 passing around the sprocket 346 and around a sprocket 350 on the input shaft 344. Within the one-revolution clutch unit 342 there is provided a toothed clutch member 352 secured to the input shaft 344 and a driven toothed clutch member 354 which is slidably and rotatably mounted with relation to the shaft 344 and is keyed to turn with and to slide axially with respect to a mating sleeved element 356 which is rigidly secured to turn with the cam shaft 308 and cams 306, 320 thereon. A coiled spring 358 seated at one end against the movable clutch member 354, and at its other end against the sleeve clutch shaft connected member 356 biases the movable clutch member 354 into clutching relation to the driving clutch member 352. The driven clutch member 354 is normally held in its retracted inoperative position by engagement with a pin 360 operated by a solenoid 362. When the solenoid 362 is momentarily energized, the withdrawal of pin 360 permits the clutch member 354 to engage the driving clutch member 352, thus connecting the cams 306, 320 to be rotated by the continuously driven shaft 344. At the end of one revolution of the cams, the armature pin 360 engages a slot in the peripheral face of the movable clutch member 354 shifting the clutch to its inoperative position.

Material removed from the shrimp back vein during the cover muscle strip removal and vein cleaning operation is drawn off through a suction system which is generally shown in FIG. 4 of the drawings as comprising the hood 123 mounted immediately above the router 38 and a suction pipe 366 forming an upward extension of the hood. Suction mechanism of any ordinary description may be employed and is not here shown. To assist in clearing away the unwanted material, fine water jets are provided with the machine and are mounted so that they will perform especially three important duties with respect to the operation of the machine. Water is supplied under pressure through a manifold 368 as shown in FIG. 4. One water jet 370 is mounted so that it sprays directly on the router and back vein of the shrimp. This jet operates to wash and to clean the router. Additionally, water from this jet is drawn up along with the gouged-out material so that a means of lubrication is provided for said material passing through the suction line. A second water jet 372 is positioned so as to strike the back vein of the shrimp just as the shrimp leaves the vein cleaning assembly. The function of this jet is to clean the back vein of any sand or other extraneous material which might further be present after passage through the vein cleaning assembly. It has been found that the best results can be gotten in this operation if the jets are so positioned that the water spray strikes the shrimp at an angle of incidence of less than 90° with relation to the back vein of the shrimp. A third water jet 374 is mounted so as to supply the belly rasp 20 including the shrimp receiving groove 22 so as to keep the rasp clear of the fine bits of flesh which tend to collect on it in the rasping process. Thus, the rasp is kept clean and the teeth thereof are maximally effective, and there is appreciably less build up of extraneous material on the machine which would, depending on the length of time in operation, create a serious contamination problem.

The operation of the shrimp processing apparatus will be particularly described in connection with the processing of cooked shrimp for which the apparatus was particularly intended, it being understood, however, that the apparatus is equally available for the processing of shell-on cooked shrimp and raw (green headless) shell-on shrimp.

Cooked peeled shrimp are placed, head leading foremost, onto the pair of inclined oppositely rotating parallel rollers 24, 26. As previously note, these rollers are of relatively small size and are spaced closely enough together to cause the head of the shrimp to ride high.

It is assumed that the feed mechanism has been tripped into operation by the energizing of feed solenoid 362 causing the indexing feed roll 28 to rise momentarily releasing one shrimp, and the feed roll 30 to move upwardly and to the left from the position shown in FIG. 4 to permit the passage of the newly released shrimp which travels down to the terminus of the carrier rolls where its head makes contact with the main rasp 20 and its tail is pincered in the tail stop and guides 32, 34.

Now the driven feed wheel 30 finishes its return downward stroke. At the base of this stroke the feed wheel proper contacts the dosal portion of the shrimp waiting to be fed. At this point the shrimp head is contacting the rasp but is almost at right angles to the face thereof.

There results from this action of the feed wheel 30 a simultaneous pushing and lifting action on this shrimp which forces its head full onto the rasp 20, causing the ventral portion of the head to turn sharply upward and then the entire head to rise toward the primary guide wheel 36, forced as it is between the driving force applied by the main rasp 20 and that of the feed wheel 30. And it does so with the shrimp being held in the upright position required because of the guiding function of the concavities of the rasp and the feed wheel.

As the shrimp head makes contact with the primary guide wheel 36 and becomes taken up by it (dorsally) and by the rasp 20 (ventrally), the shrimp is being driven forward, held between rasp and guide wheels, and the shrimp tail is forced through the tail guides 32, 34 positioned between and under the carrier rollers.

These two tail guides 32, 34 exert opposing lateral pressures on the lower tail portion of the shrimp which in combination with the guide wheels 36, 40 insure control and positioning of the entire length of the shrimp, and avoid the possibility that the lower portion of the shrimp might be twisted or turned on its side during feeding even though the head had been started through the primary guide wheel in the requisite upright position.

As the shrimp passes over the rasp under the primary guide wheel, the head comes in contact with the router 38. The router, counter-rotatory and set at the required depth for the particular size being run by means of the screw adjustment, begins its de-veining cut. The final depth of cut of the router is controlled and kept proportional to the depth of the back vein along the entire length of the shrimp by said adjusted relation of the router to the primary guide wheel 36 riding along the back surface of the shrimp.

Almost instantly after contacting the router, the head comes in contact with the secondary guide wheel 40 which continues to force the shrimp along, guiding it and holding it in the necessary upright position. Simultaneously it prevents any disruption of flow which might occur as a result of the shrimp's head coming in contact with the counter-rotatory router 38. As the tail is fed past the router 38, the dorsal cover muscle strip snaps off at the last segment and the dorsal cover muscle strip itself is drawn away by the suction manifold 366 positioned just above the vein cleaning assembly.

As the shrimp proceeds through its course and exits from the vein cleaning assembly, fine jets of water 372 play on the shrimp from manifold 368 positioned so that the jets of water strike the center of the vein at an angle of incidence less than 90°. These water jets clean out any extraneous matter which might be left in the vein.

Having left the vein cleaning assembly entirely, the shrimp follows the turn of the rasp with portions of the ventral surface making contact with the rasp proper while portions of the back contact the free-rolling support rollers 50.

As the shrimp head approaches the head-stop 42, the first time-delay built into the electrical system terminates, the solenoid 232 is engaged and the head-stop 42 and support rollers 50 are simultaneously drawn in toward the rasp. The shrimp is now held firmly against the rasp along its entire length by means of the head-stop and by the several holding units which are spring pressed so that a uniform pressure is exerted on the shrimp over its entire length. As previously pointed out the support rollers 50 engaging the tail are formed with a narrow included angle to capture the relatively narrow tail.

When the first feed time-delay terminates and the head-stop 42 and shrimp holding trucks 44, 46 and 48 are moved inwardly toward the rasp 20, the high speed electric clutch element 88 is simultaneously engaged.

The completion of a second time-delay period built into the electrical system marks the end of the high-speed rasp portion of the cycle. The electric clutch 88, 90, 92 reverts to slow or feed speed; the solenoid 232 disengages causing the head-stop 42 and support rollers 50 to be retracted; and the finished shrimp drops out of the machine. Finally the solenoid 362 is energized to initiate the feed of a new shrimp into the machine.

The electrical programming control system of the shrimp processing machine is triggered into operation by a cycle initiating switch 376 (see FIGS. 1, 8 and 17) which is actuated by the outward swinging movement of the primary guide wheel 36 and its supporting shaft 114 when engaged by a feeding shrimp as shown in FIG. 9.

As best shown in FIG. 8, the swinging movement of the shaft 114 bodily about the axis provided by shaft 126 causes the rear end of the shaft 114 to raise a lever arm 378 pivoted at 380 to the rear side of plate 74 which in turn engages and raises the forwardly offset end of a vertically slidable rod 382 supported on the outer face of plate 66 of the driving unit of the machine. The upward movement of rod 382 tilts an operating lever 384 which momentarily closes the cycling switch 376.

The system in use is built around three high reliability mercury-wetted contact relays 386, 388, 390 acting in a two-period programming cycle. A primary delay takes place after the impulse provided by the closing of the cycle initiating switch 376 during which the dorsal cover muscle strip and vein cleaning operation takes place and a secondary delay is initiated which is timed to last during the holding high-speed rasping period of operation. The primary delay allows the shrimp, after the primary guide wheel 36 has been raised to actuate the cycling switch 376 to pass through the vein cleaning station and to approach the holding position against the head-stop 42.

Upon the completion of the primary delay, the machine is conditioned for performance of the high-speed ventral surface rasping operation, and a second delay is initiated which marks the duration of this latter rasping operation. Thereupon the high-speed, low-speed clutch is returned to the low-speed position; the solenoid 232 for actuating the holding and head stop assembly is rendered inoperative, the mechanism for feeding the new shrimp into the machine is rendered operative, and the electrical control system is returned to its initial condition.

The arrangement and operation of the several devices of the electrical system will be described briefly in connection with diagram FIG. 17 of the drawings. Electricity is supplied through a main line connection $L_1$ and $L_2$ through a main starting switch 400 to lines 402 and 404 across which are connected the main driving motor 62, the actuating solenoid 232 for the holding and head-stop mechanism, and the feed mechanism actuating solenoid 362. A manual start-and-stop switch 406 is provided in the connections for the motor 62. The operation of the several relays 386, 388, 390 is controlled by means of a direct current circuit which includes a rectifier 410 which has connected thereto lines 412 and 414 across which are connected in parallel relation the first relay 386, the second relay 388, the third relay 390, the slow-speed clutch solenoid 90 and the high-speed clutch solenoid 88.

To achieve the desired delay-activate, delay-release effect, a time-delay circuit composed of a variable condenser unit 416 and a surge limiting resistor 417 in a series parallel arrangement with the winding of the second relay 388 is provided. A similar arrangement is provided in connection with the winding of the third relay consisting of a variable condenser unit 418 and a power-limiting resistor 419. The operation of the electrical system above generally described is as follows:

The closing of the cycle initiating switch 376 energizes the first relay 386. Switch contact $R1^2$ closes forming a holding circuit for the relay and $R1^1$ opens halting the feed mechanism. At the same time $R1^3$ closes and the circuit is completed through the time delay device 416 so that the second relay 388 will be activated after a delay interval which may be adjustably set between .1 and .3 second. During this period, the vein cleaning operation takes place and the processed shrimp advances within a short distance of the intended holding position. The closing of the second relay 388 causes $R2^1$ contact to close completing the circuit for the winding of the third relay 390. Contact $R3^1$ closes energizing solenoid 232 for actuating the shrimp holding and head stop mechanism. A contact $R3^3$ opens disengaging the slow-speed clutch element 90 and closes in the circuit energizing the high-speed clutch element 88 so that the rasp is driven at a high speed. At the same time contact $R3^2$ opens allowing the first relay 386 to open which in turn de-energizes the second relay 388. Contact $R2^1$ opens the circuit of the winding of the third relay 390. Contact $R3^4$, however, has moved to close the series circuit containing the charged variable condenser unit 418 and the winding of the third relay 390 which begins the second delay period. The length of time required for the current from the charge on the condenser unit 418 to decay to the value of the dropout current of the relay 390 is the required dwell for the rasp cycle. During this dwell the contact $R3^1$ holds open the circuit of the feed mechanism.

As the dropout current for the third relay winding 390 is reached the contact $R3^3$ opens the circuit of the high-speed clutch and energizes the low-speed clutch, returning the rasp to "feed" speed; the contact $R3^1$ opens, de-energizing the solenoid 232 for the holding and head stop device, and closes on the circuit permitting the feed device to again actuate. At the same time contact $R3^2$ is closed permitting the activation of the cycle initiating switch 376 to begin another cycle and finally contact $R3^4$ opens the series circuit of the condenser unit 418, and places this unit in "charge" position across the circuit in series with power-limiting resistor 419, thus returning the electrical system to its initial condition.

FIG. 18 of the drawings illustrates a modification of applicant's shrimp processing machine and method whereby shrimp are continuously advanced through the machine with a substantial increase in the rate of processing. In the modified form of the invention, the shrimp transfer member or rasp 20 is continuously driven at a high-speed rasping rate so that shrimp fed to the machine are subjected continuously to the ventral rasping operation, while at the same time the shrimp guiding and deveining unit of the machine functions to advance the shrimp at a relatively slow feed rate past the rotary router wheel 38. In this manner the ventral rasping operation and the dorsal deveining operation are carried out simultaneously. In this embodiment of the invention the shrimp holding unit including the trucks 44, 46 and 48 and shrimp engaging rolls 50 together with the head stop 42 illustrated and described in connection with the first embodiment of the invention are omitted and the processed shrimp as it passes beyond the de-veining and holding assembly is thrown outwardly from the rapidly rotating rasping wheel 20.

Referring particularly to FIG. 18 the shrimp processing machine shown is identical with that previously described except for the changes hereinafter noted. The entire shrimp holding unit including the trucks 44, 46 and 48 and the head stop 42 together with the operating and control devices therefor are omitted from the machine. The shrimp transfer member or rasp 20 is now driven at the high-speed rate through the high-speed side of the two-speed clutch above referred to which is maintained at all times in the high-speed position. In the modification shown in FIG. 18 the auxiliary feed wheel 28 and feed wheel 30 are periodically operated to select and to feed shrimp successively to the machine by the cam 320 in the manner above described. The cam 320, however, is continuously driven through a variable speed gear box to advance shrimp into the machine at the desired rate. The driving connections 320, as shown in FIG. 18 include a driving belt 430 connected between a pulley on the continuously driven drive shaft 126 and a pulley 432 connected to the input shaft of a reduction gear unit 434. A driving belt 436 connected to the output shaft of the reduction gear box 434 and a gear 438 secured to the hub of the cam 320 acts to drive the cam 320 at a rate determined by the setting of the gears in the box 434.

In operation it will be understood that the feed mechanism including the auxiliary feed roll 28 and driven feed roll 30 operate in the manner above described to select and to feed a shrimp to the rasp wheel 20, the rotation of the rasp wheel 20 and of the feed wheel 30 both in the direction of feed combining to force the head of the shrimp beneath the guide roll 36 biased against the dorsal side of the shrimp. The guide wheel 36 and guide wheel 40 are continuously driven at a feed rate through the mechanism above described. These guide wheels together with the rotary routing tool 38 driven in a direction counter to the direction of feed act to retard and to control the rate of feed of the shrimp through the machine so that the rapidly rotating rasp 20 is operative to effect the rasping of the ventral surface of the shrimp simultaneously with the performance of the de-veining operation.

The method and machine of both of the embodiments of the invention shown are available also for the processing of raw shrimp which have been de-headed and de-shelled in accordance with well-known procedures.

Further in accordance with the invention, it has been found that the illustrated method and machine for the processing of shrimp may be successfully employed for the additional removal of the shell and legs from the shrimp at the same time in a single combined operation. For this operation the shrimp, either cooked or raw, is fed to the machine which is identical with that previously described except that a shrimp transfer member or rasp 20 having a much coarser rasping surface is preferably employed. The router acts in the manner previously described to form a V-shaped cut along the length of the back vein from the anterior-most portion of the first abdominal segment to the anterior-most portion of the sixth abdominal segment. This action results in separating the shell along the entire length of the back vein. A coarser rasp 20 than that normally used having higher sharper teeth separated by a greater gap space is preferred. Such a rasp was found to be well adapted for removing the legs or pleopods, the ventral shell and the so-called leg fat characteristic of the shrimp before it is de-shelled. The processed shrimp which is the product of this operation will have pieces of shell adhering to the sides thereof, although in many instances a considerable portion of this shell may be thrown off by the routing and rasping operations referred to.

Further in accordance with the procedure above described the processed shrimp is now placed in a washer of conventional design which is well adapted for removing the remaining laterally adhering shell. After passage through the machine and washer, the shrimp may be subjected to a final hand finishing operation. In the operation above described all shell including the shelled portion of the sixth segment of the shrimp abdomen plus the telson and uropods will have been removed, the back vein is cleaned, the leg fat has been removed, and the ventral portion of the sixth segment has been rasped sufficiently so that effective freeze-drying of the shrimp can be carried on without any ill-effect upon rehydration of the product after freeze-drying.

The invention having been described what is claimed is:

1. A machine for processing shrimp which comprises a base, a rotary shrimp transfer member mounted on the base having a shrimp receiving rasp-surfaced peripheral groove coaxial with said transfer member and formed with a transverse curvature conforming substantially to the configuration of the ventral portion of the shrimp and a peripheral curvature conforming susbtantially to the lengthwise curvature which would normally be assumed by the shrimp during cooking, a guide wheel cooperating with the shrimp transfer member for guiding and advancing a shrimp engaged in said groove about the axis of the transfer member headfirst at a feed rate, a rotary de-veining routing tool, means supporting the guide wheel and routing tool against the dorsal surface of a shrimp engaged in said groove, means to rotate said routing tool and means rotating said guide wheel to advance the shrimp at said feed rate, and means for rotating the transfer member at a high rasping rate in said direction of advance so that the rasp-surfaced groove of said transfer member is moved from tail to head of the shrimp for rasping the ventral portion thereof.

2. A machine for processing shrimp which comprises a base, a rotary shrimp transfer member mounted on the base having a shrimp receiving rasp-surfaced peripheral groove for engagement with the ventral surface of the shrimp along its length, a feed-in device having a grooved feed wheel movably supported adjacent said transfer member for movement toward said groove against the dorsal surface of a shrimp, devices for externally supporting and advancing said shrimp in the groove about the axis of the transfer member including a grooved guide wheel movably supported adjacent said transfer member for movement toward said groove against the dorsal surface of a shrimp, means biasing each of said feed wheel and guide wheel toward said groove, means rotating each of said feed wheel and guide wheel in a direction to advance the shrimp in said groove about the axis of the transfer member, and means for rotating the transfer member relative to the supported shrimp for rasping the ventral surface of said shrimp.

3. A machine for processing shrimp which comprises a base, a rotary shrimp transfer member mounted on the base having a shrimp receiving rasp-surfaced peripheral groove formed with a transverse curvature conforming subtantially to the configuration of the ventral portion of the shrimp and a peripheral curvature conforming substantially to the lengthwise curvature which would normally be assumed by the shrimp during cooking, means cooperating with the shrimp transfer member for guiding and advancing a shrimp engaged in said groove about the axis of the transfer member headfirst at a feed rate comprising a guide wheel having a serrated peripheral surface concaved and of less width than the peripheral groove of the transfer member for engaging the dorsal surface of the shrimp, a support for said guide wheel movably mounted on said base on which said guide wheel is biased against said shrimp receiving rasp-surfaced peripheral groove, means rotating said guide wheel to advance said shrimp at the feed rate, and means for rotating the transfer member at a rasping rate in said direction of advance for rasping the ventral portion of the shrimp from tail to head.

4. A machine for processing shrimp which comprises a base, a rotary shrimp transfer member mounted on the base having a shrimp receiving rasp-surfaced peripheral groove formed with a transverse curvature conforming substantially to the configuration of the ventral portion of the shrimp and a peripheral curvature conforming substantially to the natural lengthwise curvature which would normally be assumed by the shrimp during cooking, shrimp guiding and advancing means cooperating with the shrimp transfer member comprising a guide wheel movably supported on said base having a serrated peripheral surface concaved and of less width than the shrimp receiving groove of said transfer member, means biasing said guide wheel toward said transfer member to engage a shrimp against said shrimp receiving groove, means rotating said guide wheel in a direction to advance a shrimp headfirst at a feed rate in said shrimp receiving groove about the axis of the transfer member, a rotary de-veining routing tool supported adjacent said guide wheel for engagement with the dorsal surface of the shrimp, means rotating the routing tool, and means for rotating the transfer member at a high rasping rate in said direction of advance for rasping the ventral portion of the shrimp from tail to head.

5. A machine for processing shrimp which comprises a base, a rotary shrimp transfer member mounted on the base having a shrimp receiving rasp-surfaced peripheral groove formed with a transverse curvature conforming substantially to the configuration of the ventral portion of the shrimp and a peripheral curvature conforming substantially to the natural lengthwise curvature which would normally be assumed by the shrimp during cooking, means cooperating with the shrimp transfer member for guiding and advancing a shrimp engaged in said groove about the axis of the transfer member headfirst at a feed rate, holding means to arrest and support the shrimp at a rasping station relative to the rotational axis of the transfer member including a head stop element operative to engage and arrest the feed of said shrimp with the rotary member, and driving means for rotating said rotary shrimp transfer member in the feed direction to rasp the ventral portion of the arrested shrimp in a direction from tail to head.

6. A machine for processing shrimp which comprises a base, a rotary shrimp transfer member mounted on the base having a shrimp receiving rasp-surfaced peripheral groove formed with a transverse curvature conforming substantially to the configuration of the ventral portion of the shrimp and a peripheral curvature conforming substantially to the natural lengthwise curvature which would normally be assumed by the shrimp during cooking, means cooperating with the shrimp transfer member for guiding and advancing a shrimp engaged in said groove about the axis of the transfer member headfirst at a feed rate, a rotary routing tool engaging the dorsal surface of the shrimp during the advance of the shrimp about the axis of the transfer member to de-vein and to remove the overlying strip of muscle material extending along the dorsal surface of the shrimp, holding means to arrest and support de-veined shrimp at a rasping station relative to the rotational axis of the transfer member, means for driving said rotary shrimp transfer member alternatively at a feed rate and at a higher rasping rate, and control means for driving said transfer member at the feed rate for advancing the shrimp through the de-veining station and at the rasping rate when the shrimp reaches the rasping station.

7. A machine for processing shrimp which comprises a base, a shrimp transfer member rotatably mounted on said support having a shrimp receiving rasp-surfaced peripheral groove formed with a transverse curvature conforming substantially to the configuration of the ventral portion of the shrimp and a peripheral curvature conforming substantially to the lengthwise curvature which would normally be assumed by the shrimp during cooking, means cooperating with the shrimp transfer member for guiding and advancing a shrimp engaged in said groove about the axis of the transfer member headfirst at a feed rate, holding means cooperating with said shrimp transfer member to support said shrimp in said groove with the head in a leading position including a plurality of shoes having wheels for engaging portions of said shrimp along its length, and yieldably operative to force the shrimp against said groove, and a head stop element for arresting said shrimp in said engaged position, means for moving said head stop element to said stop position and simultaneously for moving said shoes into engagement with the shrimp, driving means for rotating said shrimp transfer member at a feed rate and alternatively at a higher rasping rate, and control means operative to drive said circular member at the feed rate and thereafter at the rasping rate and simultaneously to render said shrimp head stop element and said shoes operative to engage the shrimp against said groove.

8. A shrimp processing machine which comprises a base, a rotatable shrimp transfer member having a peripheral groove in which the shrimp is advanced for processing having a peripheral groove substantially semicircular in cross section, of a width conforming substantially with the engaging ventral portion of the shrimp, and with an inside peripheral diameter of between ¾" and 2½", guiding and de-veining means externally engaging a shrimp in said groove comprising a guide wheel having a peripheral shrimp engaging guide surface supported adjacent the shrimp transfer member for movement into said groove, a rotary routing tool having teeth shaped to de-vein the shrimp supported on the machine with said guide wheel for movement toward said groove, and driving means for said shrimp transfer member, guide wheel and routing tool including means for rotating said guide wheel in a direction and at a rate to advance a shrimp in said groove about the axis of said shrimp transfer member past said routing tool.

9. A shrimp processing machine which comprises a base, a rotatable shrimp transfer member having a peripheral shrimp receiving groove shaped to conform with the ventral portion of a shrimp and in which the shrimp is advanced for processing, a rotary routing tool having teeth shaped to de-vein the shrimp, a guide wheel having a peripheral shrimp engaging guide surface slotted to receive said router teeth, a frame on which said guide wheel and router are supported in spaced relation to one another and with the router disposed at a cutting depth with relation to the guide surface of said guide wheel, means supporting said frame to cause said guide wheel to follow the dorsal contour of a shrimp in said concaved shrimp receiving groove, and means for rotating said shrimp transfer member and guide wheel in the feed direction, and said routing tool in a direction to turn the bottom cutting teeth thereof into the slotted peripheral shrimp engaging guide surface of said guide wheel.

10. A shrimp processing machine according to claim 9 in which the router is mounted on a support pivoted on said frame coaxially with the guide wheel, and adjustable means is provided for determining the angular position of said router support on said frame to determine the depth of cut.

11. A shrimp processing machine according to claim 9 in which the slotted peripheral shrimp engaging guide surface of the guide wheel is closely fitted to the sides of the routing teeth, and the bottom of said slot is spaced from said teeth to provide space for the removal of gouged material therethrough.

12. A shrimp processing apparatus which comprises a base, a rotatable shrimp transfer member having a concaved peripheral groove shaped to engage the ventral portion of a shrimp, and in which the shrimp is advanced for processing, a primary guide wheel and a secondary guide wheel successively engaging the dorsal surface of the shrimp, each having a peripheral surface concaved across its width and of less width than the peripheral annular groove in said circular member, pivoted supports for said guide wheels mounted on said base and on which said guide wheels are biased toward the circular member for engaging and pressing a shrimp against the concaved surface of said circular member, a rotatable vein cleaning routing tool, means for supporting said routing tool between said guide wheels in a predetermined relation to one said support to establish a cutting depth with relation to the associated guide wheel, and means for driving said transfer member and said guide wheels for advancing a shrimp therebetween, and for driving said routing tool for the performance of said vein cleaning operation.

13. A shrimp processing machine which comprises a base, a shrimp transfer member rotatable on a horizontal axis having a concaved shrimp receiving groove in which the shrimp is advanced for processing, and a feed assembly on which shrimp are serially fed to said transfer member comprising a pair of inclined longitudinally extending counter-rotating rolls abutting at their lower ends an upwardly moving portion of said shrimp receiving groove and spaced to support shrimp between adjacent upwardly moving surfaces with the head portion of the shrimp upstanding between said rolls, a feed roll, and means for moving said feed roll between a retracted position and an advanced position engaging the head portion of a shrimp against said shrimp receiving groove, an auxiliary feed roll normally disposed in a shrimp blocking position, and means for retracting said auxiliary roll momentarily to permit the passage of a shrimp past said roller, driving means for continuously rotating said shrimp transfer member and feed roll at a feed rate, and a control device for simultaneously moving each of said feed roll and auxiliary feed roll to release and feed a shrimp to said shrimp transfer member.

14. A shrimp processing apparatus which comprises a base, a shrimp transfer member rotatably mounted on said support having an annular shrimp receiving peripheral groove serrated to form a shrimp ventral portion engaging surface, guiding means including a guide wheel having a peripheral surface serrated and concaved across its width and of a width less than the width of the annular groove of said shrimp transfer member, means movably supporting and biasing said guide wheel toward said shrimp transfer member for engaging and pressing a shrimp against the concaved surface of said shrimp transfer member, means for feeding shrimp to said processing apparatus comprising a pair of inclined longitudinally extending counter-rotating rolls spaced to support shrimp therebetween, a feed roll, means for reciprocating said feed roll to position and to engage said roll behind the head of a shrimp to feed said shrimp against said transfer member, driving means for rotating said feed roll, said guide roll and said shrimp transfer member in the feed direction, and a pair of tail guide plates mounted between the parallel rollers and shrimp transfer member for guiding the tail portion of a shrimp engaged by said feed roll and guide roll into the peripheral groove of said shrimp transfer member.

15. A machine for processing shrimp having, in combination, a base, a shrimp transfer member rotatably mounted on the base having a peripheral groove, the surface of which is serrated for engagement with the ventral portion of the shrimp, cooperating guiding and operating devices including a guide wheel movably supported and biased toward said transfer member for engagement with a shrimp in said groove, holding means spaced about the transfer member from said wheel shiftable between inoperative and holding positions to arrest and support the shrimp against said peripheral groove, means for driving said shrimp transfer member alternatively at a slow feed and a fast rasping rate, and an electrically operated control system for said machine comprising a time delay switching device energized by a shrimp induced outward movement of said guide wheel operative after a predetermined time delay to move said holding device to shrimp arresting and holding position, to drive said shrimp transfer member at a fast rasping rate, and to energize a second time delay switching device, and switching connections rendered operative by said second time delay switching device on expiration of the time period to shift said holding device to inoperative position, and to drive said shrimp transfer member at the feed rate.

16. A machine for processing shrimp according to claim 15 in which there is provided a feed-in mechanism acting when rendered operative to select and to feed a shrimp to said shrimp receiving peripheral groove, and a switching connection rendered operative by said second time delay switching device to render said feed-in mechanism operative.

17. A machine for processing cooked shrimp which comprises a base, a shrimp transfer member rotatably mounted on said support having a shrimp receiving peripheral groove serrated to form a rough shrimp ventral portion engaging surface, and of a diameter to provide a peripheral curvature substantially conforming to the natural curve of the cooked shrimp, holding means cooperating with said shrimp transfer member to support said shrimp in said groove with the head in a leading position including a plurality of shoes having wheels for engaging portions of said shrimp along its length, said wheels being arranged in pairs having shrimp engaging surfaces set at a progressively wider included angle from the tail to the head of the shrimp, a rock shaft, and a yieldable connection from said rock shaft to each said shoe actuated by the rocking of said shaft to force the shoes and wheels yieldably against the shrimp, a head stop element movable between retracted and shrimp arresting positions, a connection from said rock shaft actuated by said rocking movement to move said head stop to the stop position, means for driving said shrimp transfer member, and means for rocking said shaft to engage and arrest a shrimp to be rasped by the driven shrimp transfer member.

18. A machine for processing shrimp having, in combination, a base, a driving unit mounted on said base, a shrimp processing head comprised entirely of non-corrosive high-temperature resistant materials movably mounted on said base comprising a panel, and shrimp supporting, guiding and operating devices mounted on said panel including a rotary shrimp transfer member having a shrimp receiving rasp-surfaced peripheral groove supported on said panel, a shrimp engaging guide wheel mounted on said panel for movement toward said peripheral groove, a rotary de-vening routing tool supported on said panel for movement with said guide wheel toward said peripheral groove, means biasing said guide wheel and routing tool toward said groove, operating mechanism on said panel for actuating each of said transfer wheel, guide wheel and routing tool for processing shrimp, disconnectable coupling means between said driving unit and said operating mechanism, and removable fastening means for securing said shrimp processing head to the base.

19. The method of processing shrimp which comprises the steps of supporting the ventral side of a shrimp in the shrimp receiving rasp-surfaced groove of a rotary shrimp transfer member of which said groove is formed with a transverse curvature corresponding substantially with the configuration of the ventral portion of the shrimp and a peripheral curvature conforming substantially to the natural lengthwise curvature of the shrimp assumed during cooking, biasing a guide wheel against the dorsal surface of a shrimp engaged in said groove, rotating said guide wheel in the direction of feed and at a rate to advance the shrimp at the desired feed rate about the axis of said transfer member in said groove, applying a rotating routing tool along the dorsal surface of the shrimp to de-vein and to remove the overlying strip of muscle material extending along the back of the shrimp, and simultaneously rotating said shrimp transfer member in the direction of feed at a high rate of speed compared with the feeding rate of said guide roll to rasp the ventral surface of the shrimp.

20. The method of processing shrimp which comprises the steps of supporting the ventral side of a shrimp in the shrimp receiving rasp-surfaced peripheral groove of a rotary shrimp transfer member of which said groove is formed with a transverse curvature conforming substantially to the configuration of the ventral portion of the shrimp and a peripheral curvature conforming substantially to the natural lengthwise curvature which the shrimp would assume during cooking, externally supporting and effecting a controlled advance of the shrimp engaged in said groove about the axis of the rotary shrimp transfer member, applying a rotating routing tool along the dorsal surface of the shrimp to de-vein and to remove the overlying strip of muscle material extending along the back of the shrimp, rotating said transfer member at a feed rate to advance the shrimp headfirst past said de-veining routing tool, arresting the advance of the shrimp, and rotating said transfer member at a high rasping rate in the direction of feed to rasp the ventral surface of said shrimp from tail to head.

References Cited by the Examiner
UNITED STATES PATENTS

| | | | |
|---|---|---|---|
| 2,702,921 | 3/1955 | Pinney | 17—2 |
| 2,716,776 | 9/1955 | Streich et al. | 17—2 |
| 2,772,442 | 12/1956 | Matter | 17—2 |
| 2,784,450 | 3/1957 | Jonsson | 17—45 |
| 2,850,761 | 9/1958 | Jonsson | 17—2 |
| 2,960,719 | 11/1960 | Merrick | 17—2 |
| 3,040,374 | 6/1962 | Miller | 17—2 |
| 3,084,379 | 4/1963 | Henning | 17—45 |

SAMUEL KOREN, *Primary Examiner.*

LUCIE H. LAUDENSLAGER, *Examiner.*